U. G. WEIDMAN.
SPRING WHEEL.
APPLICATION FILED OCT. 3, 1911.
1,039,857.
Patented Oct. 1, 1912.
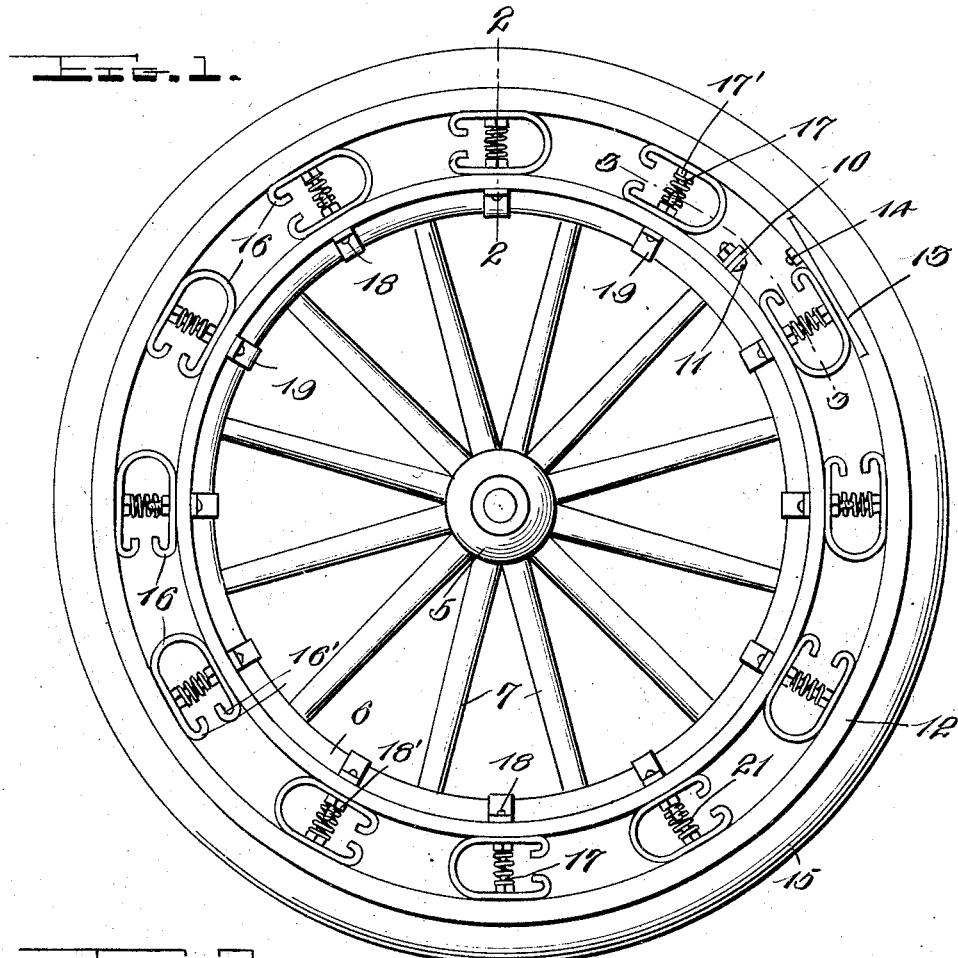
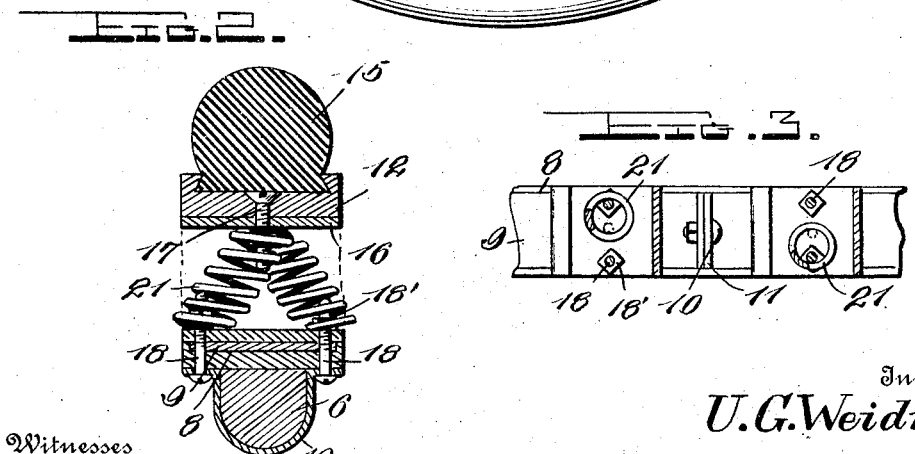
Witnesses
Chas. L. Griesbauer.
L. H. Ellis.
Inventor
U. G. Weidman,
By Watson E. Coleman.
Attorney

UNITED STATES PATENT OFFICE.

U. GRANT WEIDMAN, OF KNIGHTSTOWN, INDIANA.

SPRING-WHEEL.

1,039,857.  Specification of Letters Patent.  Patented Oct. 1, 1912.

Application filed October 3, 1911. Serial No. 652,541.

*To all whom it may concern:*

Be it known that I, U. GRANT WEIDMAN, a citizen of the United States, residing at Knightstown, in the county of Henry and State of Indiana, have invented certain new and useful Improvements in Spring-Wheels, of which the following is a specification, reference being had to the accompanying drawings.

This invention relates to spring wheels for vehicles such as automobiles and heavy trucks and has for its object to provide a device of this character which combines great strength and durability with a high degree of elasticity.

Another object of the invention is to provide a spring wheel having inner and outer rims, means for easily, quickly and securely attaching the inner rim to the felly of the wheel and a plurality of cushioning devices arranged between and secured to said inner and outer rims and including means for preventing relative transverse movement of the wheel rims.

With these and other objects in view, the invention consists of the novel features of construction and the combination and arrangement of parts hereinafter fully described and claimed, and illustrated in the accompanying drawings, in which—

Figure 1 is a side elevation of a wheel embodying my improvement; Fig. 2 is a section taken on the line 2—2 of Fig. 1; and Fig. 3 is a section taken on the line 3—3 of Fig. 1.

Referring in detail to the drawing 5 designates the hub of the wheel and 6 the felly thereof which is connected to the hub by means of the radial spokes 7. The rim 6' of the wheel is provided with a peripheral groove or channel 8 to receive the inner wheel rim 9. This wheel rim consists of a steel band the ends of which are angularly disposed as indicated at 10 and provided with apertures to receive the fastening bolts 11. The outer rim 12 of the wheel also consists of an annular wheel band or ring, the ends of which are lapped as indicated at 13 and rigidly secured together by means of the bolts 14.

In the use of the wheel on light vehicles the outer rim would preferably be provided with a circumferential channel to receive a solid rubber tread as indicated at 15. The outer rim of the wheel is held in concentric spaced relation to the inner rim and felly of the wheel by means of a plurality of bowed spring plates 16, the end portions of which are disposed in parallel relation and arranged upon the opposed faces of the inner and outer rims. The extremities of these plates are flanged as shown at 16' inwardly and are adapted to limit the compression of said spring plates. One end of each of the plates is secured to the outer end of the wheel by means of the bolts 17 and the other end of the plate is secured to the inner rim by a pair of bolts 18, suitable nuts 17' and 18' respectively being threaded upon said bolts to rigidly secure the spring plates between the rims. Upon the felly of the wheel the usual iron rim 6' is arranged and clips 19 extend around the felly and have their ends disposed against the inner face of this rim. The securing bolts 18 extend through alined apertures in the inner rim 9 of the tire and the wheel rim 6' and through the ends of the clips to rigidly secure the same about the felly whereby said inner wheel rim is securely held in the channel of the metallic rim 6'.

In order to secure a greater degree of elasticity in the wheel, I provide the heavy coil springs 21, said springs being disposed between the parallel portions of the spring plates 16 and having their ends engaged upon the ends of the fastening bolts 17 and 18 respectively. It will be observed upon reference to Fig. 3 of the drawings that springs 21, which are arranged between the ends of adjacent spring plates 16, have their inner ends disposed about the bolts 18 upon opposite sides of the transverse center of the wheel rim so that they serve to centralize the outer rim with respect to the inner rim and prevent its relative transverse movement.

From the foregoing it is thought that the construction and manner of operation of my improved wheel will be fully understood.

The device is extremely strong and durable and may be easily and quickly arranged upon the felly of the wheel. The inwardly disposed ends of the spring plates 16 prevent the end portions of the plate from being brought too close together and eliminates liability of breaking the spring plates at their intermediate portions and of placing too great a pressure upon the inclined coil springs 21. By providing these latter springs a great amount of resiliency is secured in the rim of the wheel. I am thus enabled to dispense with the usual pneumatic tire which is commonly employed and is subject to puncture thus necessitating continual repair and additional expense. The inner and outer wheels of the rim are preferably constructed of heavy steel plate, though it will be understood that they may also be formed of iron or other metal, if desired.

While I have shown and described the preferred form and construction of the various parts, it will be understood that the device is susceptible of a great many minor modifications without departing from the essential feature or sacrificing any of the advantages of the invention.

Having thus described the invention what is claimed is:

The combination with a wheel including a felly and an annular metallic band secured upon said felly having a peripheral channel, of inner and outer rims normally arranged in spaced concentric relation, said inner rim being seated in the channel of said band, a plurality of cushioning members arranged between said inner and outer rims, securing clips extending around said felly, and fastening bolts securing the cushioning members to the inner rim and disposed through alined apertures in the rim, the band and said clips.

In testimony whereof I hereunto affix my signature in the presence of two witnesses.

U. GRANT WEIDMAN.

Witnesses:
M. C. LYDDANE,
GEO. S. LIVINGSTON.

Copies of this patent may be obtained for five cents each, by addressing the "Commissioner of Patents, Washington, D. C."